United States Patent
Park et al.

(10) Patent No.: US 10,939,279 B2
(45) Date of Patent: Mar. 2, 2021

(54) METHOD AND APPARATUS FOR DOWNLOADING PROFILE IN WIRELESS COMMUNICATION SYSTEM

(71) Applicant: Samsung Electronics Co., Ltd, Suwon-si (KR)

(72) Inventors: Jong-Han Park, Bucheon-si (KR); Duc-Key Lee, Seoul (KR); Sang-Soo Lee, Yongin-si (KR); Tae-Sun Yeoum, Seoul (KR); Song-Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/561,491

(22) PCT Filed: Mar. 24, 2016

(86) PCT No.: PCT/KR2016/002972
§ 371 (c)(1),
(2) Date: Sep. 25, 2017

(87) PCT Pub. No.: WO2016/153281
PCT Pub. Date: Sep. 29, 2016

(65) Prior Publication Data
US 2018/0070224 A1 Mar. 8, 2018

(30) Foreign Application Priority Data
Mar. 25, 2015 (KR) ........................ 10-2015-0041609

(51) Int. Cl.
*H04W 8/20* (2009.01)
*H04W 12/06* (2021.01)
(Continued)

(52) U.S. Cl.
CPC ............ *H04W 8/20* (2013.01); *H04L 63/102* (2013.01); *H04W 4/38* (2018.02);
(Continued)

(58) Field of Classification Search
CPC ...................................................... H04W 8/20
See application file for complete search history.

(56) References Cited

U.S. PATENT DOCUMENTS 9,338,071 B2 * 5/2016 Erickson ............. H04L 12/2818
9,521,547 B2 12/2016 Park et al.
(Continued)

FOREIGN PATENT DOCUMENTS

CN 103329586 A 9/2013
EP 3277002 A1 1/2018
(Continued)

OTHER PUBLICATIONS

Supplementary European Search Report dated Apr. 9, 2018 in connection with European Patent Application No. EP 16 76 9099.
(Continued)

*Primary Examiner* — Josnel Jeudy

(57) ABSTRACT

The present disclosure relates to a communication technique for combining a 5G communication system for supporting a higher data transmission rate than a 4G system with an IoT technology, and a system therefor. The present disclosure can be applied to 5G communication and IoT related technology-based intelligent services (for example, smart homes, smart buildings, smart cities, smart cars or connected cars, health care, digital education, retail business, security and safety related services, etc.). The present invention performs cross-certification of a universal integrated circuit card (UICC) with a subscription manager data preparation+ (SM-DP+) system in a wireless communication system, and receives a profile from the SM-DP+ system according to the
(Continued)

cross-certification result, wherein the profile comprises one of a profile encrypted on the basis of a key set established according to the cross-certification result, and a profile transmitted through a session established according to the cross-certification result.

8 Claims, 9 Drawing Sheets

(51) Int. Cl.
    *H04W 12/10*     (2021.01)
    *H04W 12/00*     (2021.01)
    *H04W 4/38*     (2018.01)
    *H04L 29/06*     (2006.01)
    *H04W 12/04*     (2021.01)

(52) U.S. Cl.
    CPC ....... *H04W 12/0023* (2019.01); *H04W 12/04* (2013.01); *H04W 12/06* (2013.01); *H04W 12/10* (2013.01); *H04L 29/06666* (2013.01)

(56) References Cited

U.S. PATENT DOCUMENTS

| | | | |
|---|---|---|---|
| 9,712,996 B2 | 7/2017 | Park | |
| 10,242,210 B2 | 3/2019 | Girard et al. | |
| 2009/0055918 A1* | 2/2009 | Chang | G06F 21/445 726/10 |
| 2012/0072979 A1 | 3/2012 | Cha et al. | |
| 2012/0260090 A1 | 10/2012 | Hauck et al. | |
| 2013/0148585 A1 | 6/2013 | Ohlsson et al. | |
| 2014/0031012 A1* | 1/2014 | Park | H04W 12/06 455/411 |
| 2014/0219447 A1 | 8/2014 | Park et al. | |
| 2014/0235210 A1* | 8/2014 | Park | H04W 12/04 455/411 |
| 2014/0237101 A1 | 8/2014 | Park | |
| 2014/0287725 A1* | 9/2014 | Lee | H04W 12/06 455/411 |
| 2014/0342719 A1 | 11/2014 | Lindholm | |
| 2014/0359741 A1* | 12/2014 | Kistner | H04L 63/0823 726/7 |
| 2015/0121086 A1* | 4/2015 | Smith | H04L 9/0894 713/189 |
| 2018/0070224 A1 | 3/2018 | Park et al. | |

FOREIGN PATENT DOCUMENTS

| | | |
|---|---|---|
| KR | 10-2014-0051018 A | 4/2014 |
| KR | 10-2014-0107678 A | 9/2014 |
| WO | 2013/036009 A1 | 3/2013 |
| WO | 2013/036011 A2 | 3/2013 |
| WO | 2013/048084 A3 | 4/2013 |
| WO | 2013/123233 A2 | 8/2013 |
| WO | 2016/153281 A1 | 9/2016 |

OTHER PUBLICATIONS

European Patent Office, "Communication pursuant to Article 94(3) EPC," Application No. EP16769099.9, dated Apr. 29, 2019, 7 pages.
Wikipedia, "TLS-PSK," Oct. 10, 2018, 1 page.
Office Action dated May 26, 2020 in connection with Chinese Patent Application No. 201680029988.1, 22 pages.
Written Opinion of the International Searching Authority dated Jun. 29, 2016 in connection with International Patent Application No. PCT/KR2016/002972.
International Search Report dated Jun. 29, 2016 in connection with International Patent Application No. PCT/KR2016/002972.
"Remote Provisioning Architecture for Embedded UICC Technical Specification V2.0", GSM Association Official Document SGP.02, Oct. 13, 2014, 293 pages.
Office Action dated Sep. 24, 2020 in connection with India Patent Application No. 201737037458, 6 pages.

* cited by examiner

METHOD AND APPARATUS FOR DOWNLOADING PROFILE IN WIRELESS COMMUNICATION SYSTEM

This application is a National Phase Entry of PCT International Application No. PCT/KR2016/002972, filed on Mar. 24, 2016, which claims priority to Korean Patent Application No. 10-2015-0041609, filed Mar. 25, 2015, the contents of which are incorporated herein by reference.

TECHNICAL FIELD

The present disclosure relates to a method and apparatus for downloading a profile in a wireless communication system and, particularly, to a method and apparatus for downloading a profile for providing a communication service.

BACKGROUND

In order to meet wireless data traffic demands that have increased after 4th Generation (4G) communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive Multi-Input Multi-Output (MIMO), Full Dimensional MIMO (FD-MIMO), array antenna, analog beam-forming, and large scale antenna are discussed to mitigate a propagation path loss in the mmWave band and increase propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

The Internet is evolving from a human-oriented connection network in which humans generate and consume information, to an Internet of Things (IoT) network in which distributed elements, such as objects and the like, exchange and process information. Internet of Everything (IoE) technology may be an example of a combination of IoT technology and big data processing technology through a connection with a cloud server.

In order to implement the IoT, research is being conducted on technical factors such as a sensing technique, wired/wireless communication and network infrastructure, service interface technology, and security technology are required, and thus technologies such as a sensor network, Machine to Machine (M2M), Machine Type Communication (MTC), and the like for a connection between objects.

In an IoT environment, through collection and analysis of data generated in connected objects, an intelligent Internet Technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication to the IoT network are made. For example, 5G communication technologies, such as a sensor network, object communication, and an MTC, are implemented by techniques, such as beamforming, MIMO, and array antennas. The application of a cloud RAN as the big data processing technology may be an example of convergence of the 5G technology and the IoT technology.

A Universal Integrated Circuit Card (hereinafter, referred to as "UICC") is a smart card that is inserted in a mobile communication terminal for use. A UICC stores personal information, such as network connection authentication information, a phone directory, and a Short Message Service (hereinafter, referred to as "SMS") of a mobile communication subscriber, and enables subscriber authentication and traffic security key generation when accessing a mobile communication network, such as Global System for Mobile communications (hereinafter, referred to as "GSM"), Wideband Code Division Multiple Access (hereinafter, referred to as "WCDMA"), Long Term Evolution (hereinafter, referred to as "LTE"), etc., thereby enabling secure mobile communication use.

A UICC includes a communication application, such as a Subscriber Identification Module (hereinafter, referred to as "SIM"), a Universal SIM (hereinafter, referred to as "USIM"), an Internet Protocol Multimedia SIM (ISIM), etc., depending on a type of a mobile communication network to which a subscriber is connected. Further, a UICC provides a high level of a security function for mounting various applications, such as electronic wallet, ticketing, and ePassport, etc.

A conventional UICC is manufactured as a dedicated card for a specific mobile communication service provider by a request of the corresponding service provider at the time of manufacturing the card, and is released with pre-installed authentication information (e.g., USIM application, IMSI, and K value) for a network connection of the corresponding service provider.

Therefore, the manufactured UICC is provided to a subscriber by the corresponding mobile communication service provider, and later on when necessary, management, such as installation, modification, deletion, etc. of an application within the UICC, is performed using a technology, such as Over The Air (OTA). The subscriber can use a network or an application service of the mobile communication service provider by inserting the UICC into his/her own mobile communication terminal. Further, when the terminal is replaced with a new terminal, the subscriber still can use authentication information, a mobile communication phone number, a personal phone directory, etc., which are stored in the UICC of the existing terminal, by moving and inserting the UICC of the existing terminal to the new terminal.

Meanwhile, the UICC maintains international compatibility by defining a physical shape and a logical function in the European Telecommunications Standards Institute (ETSI). From the aspect of a form factor defining the physical shape, the size of a SIM is becoming smaller, the SIM including the most widely used Mini SIM to a Micro SIM that has been in use for several years, and more recently to a Nano SIM.

This contributes to miniaturization of mobile communication terminals. However, it is expected that a UICC smaller in size than the recently established Nano SIM would have difficulty in standardization thereof due to the concern of losing the UICC by a user. In addition, due to the nature of a removable UICC, it is expected that the UICC would have difficulty in further miniaturization thereof because a space is required to mount a detachable slot in the terminal.

Further, a detachable UICC is not suitable for a Machine-to-Machine (hereinafter, referred to as "M2M") device which requires access to a mobile communication data network without a direct human operation in a variety of installation environments, such as intelligent home appliances, electricity/water meters, and CCTV cameras, etc., In order to solve such a problem, it may be considered to use a method for replacing the conventional detachable UICC by inserting a security module performing a function similar to the UICC in a mobile communication terminal when manufacturing the terminal. Such a security module may be installed inside the terminal when the terminal is manufactured, and may be mounted so as not to be detachable from some terminals. Therefore, unless it is manufactured as a terminal dedicated to a specific mobile communication service provider, it may be difficult to pre-install network access authentication information of the specific mobile communication service provider, such as IMSI and K of USIM. Further, it is possible to set the authentication information only after a user having purchased the terminal subscribes to a service of the specific mobile communication service provider.

In addition, unlike the conventional UICC which has been manufactured and distributed exclusively for a specific mobile communication provider, a newly introduced eUICC, which is a built-in security module of the terminal, should enable secure and flexible installation and management of the authentication information of various mobile communication service providers, as a user having purchased a corresponding terminal subscribes to and terminates a service of the specific mobile communication service provider, or changes its subscription thereof to another service provider.

SUMMARY

An embodiment of the present disclosure provides a method and apparatus that downloads a profile in a wireless communication system.

Further, an embodiment of the present disclosure provides a method and apparatus that downloads a profile for providing a communication service in a wireless communication system.

Further, an embodiment of the present disclosure provides a method and apparatus that acquires server information and downloads a profile in a wireless communication system.

Further, an embodiment of the present disclosure provides a method and apparatus that receives profile information from a server and downloads a profile in a wireless communication system.

Further, an embodiment of the present disclosure provides a method and apparatus that remotely downloads profile information in a terminal equipped with an eUICC in a wireless communication system.

An embodiment of the present disclosure provides a method and apparatus that remotely downloads a profile of a communication service provider, for subscribing to a wireless communication service by using a scheme of remotely installing profile information including a subscriber identifier and an encryption key (K) in a terminal equipped with an eUICC in a wireless communication system.

Further, an embodiment of the present disclosure provides a method and apparatus that transmits or receives a profile for providing a communication service in a wireless communication system.

Further, an embodiment of the present disclosure provides a method and apparatus that may initiate a service for an eUICC terminal through a terminal of a mobile communication service provider at an agency of the mobile communication service provider or the like.

Further, an embodiment of the present disclosure provides a method and apparatus that may initiate a service for an eUICC terminal by the terminal.

A method proposed by an embodiment of the present disclosure relates to a method for downloading a profile by a Universal Integrated Circuit Card (UICC) in a wireless communication system, the method including: performing mutual authentication with a Subscription Manager Data Preparation+ (SM-DP+) system; and receiving a profile from the SM-DP+ system through a terminal according to a result of the mutual authentication, in which the profile includes one of a profile encrypted based on a key set configured according to the result of the mutual authentication and a profile transmitted through a session configured according to the result of the mutual authentication.

Another method proposed by an embodiment of the present disclosure relates to a method for providing a profile by a Subscription Manager Data Preparation+ (SM-DP+) system in a wireless communication system, the method including: performing mutual authentication with a Universal Integrated Circuit Card (UICC); and transmitting a profile to the UICC through a terminal according to a result of the mutual authentication, in which the profile includes one of a profile encrypted based on a key set configured according to the result of the mutual authentication and a profile transmitted through a session configured according to the result of the mutual authentication.

Still another method proposed by an embodiment of the present disclosure relates to a method for downloading a profile by a terminal in a wireless communication system, the method including: receiving a message including information indicating profile download; requesting a Subscription Manager Data Preparation+ (SM-DP+) system to perform authentication associated with a UICC; performing an operation for mutual authentication between the SM-DP+ system and the UICC; and based on a result of the operation, receiving a profile from the SM-DP+ system and transferring the received profile to the UICC.

Still another method proposed by an embodiment of the present disclosure relates to a method for providing a profile by a Subscription Manager Data Preparation+ (SM-DP+) system in a wireless communication system, the method including: receiving a message including first identification information that is information for identifying a Universal Integrated Circuit Card (UICC) and second identification information that is profile identification information; transmitting a message including the first identification information and information indicating to perform profile download to a Subscription Manager Discovery Service (SM-DS) system; and if a message indicating to perform authentication with the UICC is received from the SM-DS system, performing authentication with the UICC and transmitting a profile corresponding to the second identification information to the UICC.

An apparatus proposed by an embodiment of the present disclosure relates to a Universal Integrated Circuit Card (UICC) in a wireless communication system, the apparatus including: a control unit that performs mutual authentication with a Subscription Manager Data Preparation+ (SM-DP+) system; and a reception unit that receives a profile from the SM-DP+ system through a terminal according to a result of the mutual authentication under control of the control unit, in which the profile includes one of a profile encrypted based on a key set configured according to the result of the mutual authentication and a profile transmitted through a session configured according to the result of the mutual authentication.

Another apparatus proposed by an embodiment of the present disclosure relates to a Subscription Manager Data Preparation+ (SM-DP+) system in a wireless communication system, the apparatus including: a control unit that performs mutual authentication with a Universal Integrated Circuit Card (UICC); and a transmission unit that transmits a profile to the UICC through a terminal according to a result of the mutual authentication, in which the profile includes one of a profile encrypted based on a key set configured according to the result of the mutual authentication and a profile transmitted through a session configured according to the result of the mutual authentication.

Another apparatus proposed by an embodiment of the present disclosure relates to a terminal in a wireless communication system, the terminal including: a reception unit that receives a message including information indicating profile download; and a control unit that requests a Subscription Manager Data Preparation+ (SM-DP+) system to perform authentication associated with a UICC, performs an operation for mutual authentication between the SM-DP+ system and the UICC, receives a profile from the SM-DP+ system based on a result of the operation, and transmits the received profile to the UICC.

Another apparatus proposed by an embodiment of the present disclosure relates to a Subscription Manager Data Preparation+ (SM-DP+) system in a wireless communication system, the system including: a reception unit that receives a message including first identification information that is information for identifying a Universal Integrated Circuit Card (UICC) and second identification information that is profile identification information; a transmission unit that transmits a message including the first identification information and information indicating profile download to a Subscription Manager Data Preparation+ (SM-DP+) system; and a control unit that performs authentication with the UICC and controls the transmission unit to transmit a profile corresponding to the second identification information to the UICC if a message indicating to perform authentication with the UICC is received.

An embodiment of the present disclosure is effective in that a service initiation and a device change for an eUICC terminal can be efficiently performed, and a profile management server for profile downloading can be flexibly operated.

Further, an embodiment of the present disclosure is effective in that a remote installation of a profile of a communication service provider can be flexibly performed and managed in an eUICC terminal.

Further, an embodiment of the present disclosure is effective in that it is possible to download a profile in a wireless communication system.

Further, an embodiment of the present disclosure is effective in that it is possible to download a profile for providing a communication service in a wireless communication system.

Further, an embodiment of the present disclosure is effective in that it is possible to acquire information of a server to download a profile in a wireless communication system.

Further, an embodiment of the present disclosure is effective in that it is possible to receive profile information from a server to download a profile in a wireless communication system.

Further, an embodiment of the present disclosure is effective in that it is possible to remotely download profile information in a terminal equipped with an eUICC in a wireless communication system.

An embodiment of the present disclosure is effective in that it is possible to remotely download a profile of a communication service provider, for subscribing to a wireless communication service by using a scheme of remotely installing profile information including a subscriber identifier and an encryption key (K) in a terminal equipped with an eUICC in a wireless communication system.

Further, an embodiment of the present disclosure is effective in that it is possible to transmit or receive a profile for providing a communication service in a wireless communication system.

Further, an embodiment of the present disclosure is effective in that it is possible to initiate a service for an eUICC terminal through a terminal of a mobile communication service provider at an agency of the mobile communication service provider or the like.

Further, another embodiment of the present disclosure is effective in that a service for an eUICC is initiated in a terminal.

BRIEF DESCRIPTION OF THE DRAWINGS

The other aspects, features, and advantages as described in specific preferable embodiments of the present disclosure will become more apparent based on the following description taken in conjunction with the accompanying drawings, in which.

It should be noted that similar reference numerals are used to indicate identical or similar elements, features, and structures through the above figures.

DETAILED DESCRIPTION

Figure 1:
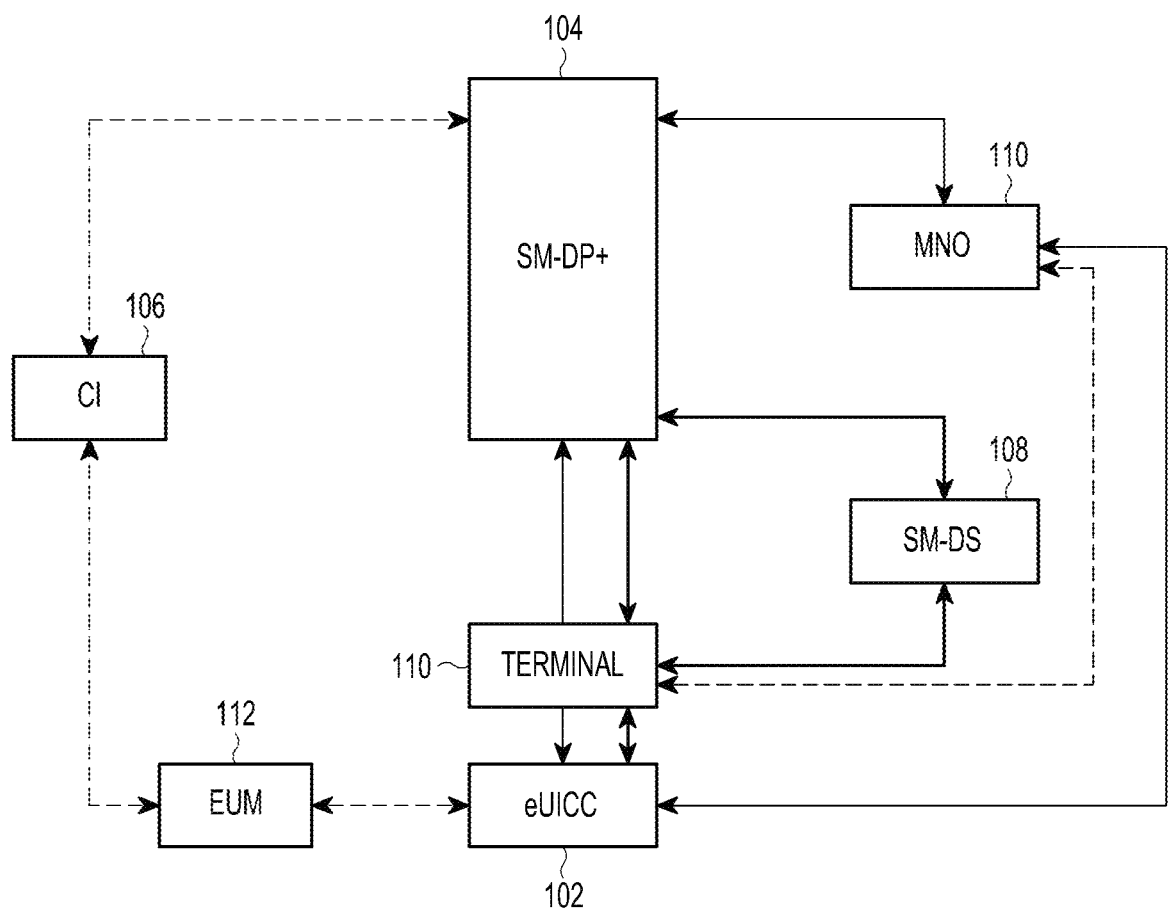
FIG. 1 is a diagram schematically illustrating an example of a structure of a wireless communication system according to an embodiment of the present disclosure.

Hereinafter, embodiments of the present disclosure will be described in detail with reference to the accompanying drawings.

In describing the exemplary embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create a means for implementing the functions specified in the flowchart block or blocks. These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the shown order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more CPUs within a device or a security multimedia card.

In describing the present disclosure below, a detailed description of related known configurations or functions incorporated herein will be omitted when it is determined that the detailed description thereof may unnecessarily obscure the subject matter of the present disclosure. Hereinafter, exemplary embodiments of the present disclosure will be described in detail with reference to the accompanying drawings.

First, terms used in the present specification will be described. The terms used in embodiments of the present specification may be defined according to terms used by those skilled in the art, but in the case of matters relating to embodiments of the present specification, operations or properties may be described in accordance with the terms used herein. In addition, in an embodiment of the present disclosure, an embedded Universal Integrated Circuit Card (hereinafter, referred to as "eUICC") may be fixedly mounted in a terminal, and may be attached to and detached from to a terminal, as a conventional Universal Integrated Circuit Card (hereinafter, referred to as "UICC"), but it should be noted that the concept covers the same functionally.

In addition, in an embodiment of the present disclosure, a UICC may be a smart card that is inserted in a mobile communication terminal for use, and may store personal information, such as network connection authentication information, a phone directory, and a Short Message Service (hereinafter, referred to as "SMS") of a mobile communication subscriber. The UICC may refer to a chip that enables subscriber authentication and traffic security key generation when accessing a mobile communication network, such as Global System for Mobile communications (hereinafter, referred to as "GSM"), Wideband Code Division Multiple Access (hereinafter, referred to as "WCDMA"), Long Term Evolution (hereinafter, referred to as "LTE"), etc., thereby enabling secure mobile communication use.

A UICC includes a communication application, such as a Subscriber Identification Module (hereinafter, referred to as "SIM"), a Universal SIM (hereinafter, referred to as "USIM"), an Internet Protocol Multimedia SIM (ISIM), etc., depending on a type of a mobile communication network to which a subscriber is connected. Further, a UICC provides a high level of a security function for mounting various applications, such as electronic wallet, ticketing, and ePassport, etc.

In an embodiment of the present disclosure, the eUICC is assumed to be a chip-type security module that is embedded in a terminal and may not be detachable. However, if a UICC, which is manufactured in a conventional detachable UICC form and has the same electrical and software characteristics and function as those of the eUICC, is only detachable but is not functionally different from the eUICC, an embodiment of the present disclosure may be applied in the same way.

In addition, an embodiment of the present disclosure may be applied to an operation of an eUICC having a form of a UICC. The eUICC may download and install a profile by using a general Internet protocol (hereinafter, referred to as "IP") network, such as a wireless communication network or Wireless Fidelity (Wi-Fi). In an embodiment of the present disclosure, there is no particular limitation on a type of network for downloading a profile.

Further, it should be noted that, in an embodiment of the present disclosure, a profile may refer to, for example, at least one of an application, a file system, and an authentication key value stored in a UICC, packaged in a software form.

Further, it should be noted that, in an embodiment of the present disclosure, a USIM profile may be used to have the same meaning as that of a profile, or may refer to information included in a USIM application within the profile, the information being packaged in a software form.

Further, it should be noted that, in an embodiment of the present disclosure, a Subscription Manager Data Preparation+ (hereinafter, referred to as "SM-DP+") system may be expressed as a Profile Provider, a profile providing server, an off-card entity of Profile Domain, a profile encryption server, a profile generation server, a profile provider, and the like.

Further, it should be noted that, in an embodiment of the present disclosure, an eUICC manager may be expressed as a Subscription Manager Secure Routing (hereinafter, referred to as "SM-SR"), a profile management server, an off-card entity of the eUICC Profile Manager, a profile manager, or the like.

It should be noted that, in an embodiment of the present disclosure, a Subscription Manager Discovery Service (SM-DS) may be expressed as a Discovery Center (hereinafter, referred to as "DC"), a Discovery & Push Function (hereinafter, referred to as "DPF"), an Address Resolution Server (hereinafter, referred to as "ARS"), a Discovery Server, a Discover Function, an Event Delivery Function, or the like.

The term "terminal" used in this specification may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a mobile node, a mobile, or other terms. Various embodiments of a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof. In addition, the terminal may also include a measurement device and the like having a communication function.

Further, in an embodiment of the present disclosure, a terminal may include a Machine to Machine (M2M) terminal, a Machine Type Communication (MTC) terminal/device, but is not limited thereto.

Further, in an embodiment of the present disclosure, a profile delimiter may be referred to as a Profile Identifier (Profile ID), an Integrated Circuit Card ID (ICCID), or a factor matching an Issuer Security Domain-Profile (ISD-P) and the ICCID. The profile ID may represent a unique identifier of each profile. In addition, in an embodiment of the present disclosure, an eUICC delimiter may be a unique identifier of an eUICC embedded in a terminal, and may be referred to as an eUICC Identifier (hereinafter, referred to as "EID"). In addition, the profile delimiter may be used to identify the profile on the network.

Hereinafter, an example of an internal structure of a wireless communication system according to an embodiment of the present disclosure will be described with reference to FIG. 1.

FIG. 1 is a diagram schematically illustrating an example of a structure of a wireless communication system according to an embodiment of the present disclosure.

The wireless communication system illustrated in FIG. 1 shows an example of a wireless communication system which remotely transmits or receives a profile for providing a communication service according to an embodiment of the present disclosure.

Referring to FIG. 1, the wireless communication system may include at least one of a terminal 100, an eUICC 102, SM-DP+ 104, a Certificate Issuer (hereinafter, referred to as "CI") 106, an SM-DS 108, a Mobile Network Operator (hereinafter, referred to as "MNO") system 110, and an eUICC Manufacturer system (hereinafter, referred to as "EUM") 112. Here, the CI 106 may be referred to as a Certificate Authority (hereinafter, referred to as "CA"). In an embodiment of the present disclosure, the terminal 110 represents a device used together with the eUICC 102 to connect to a mobile network, such as a wireless communication network. The terminal 100 may transmit a signal to or receive a signal from the eUICC 102 to install a profile, select an installed profile, delete an installed profile, or initialize a setting or a profile of the eUICC 102.

The eUICC 102 may transmit a signal to or receive a signal from the terminal 100 to install a profile, select a profile, delete a profile, or initialize a setting or a profile of the eUICC 102 itself.

The eUICC 102 may store a CI public key or a CI certificate, store a private key and the certificate of the eUICC, and authenticate SM-DP+ having a private key and a certificate issued from an identical CI and a sub-CI of the identical CI, by using the private key and the certificate of the eUICC 102.

The eUICC 102 may store a plurality of CI public keys or a plurality of CI certificates, and may use the plurality of CI public keys or the plurality of CI certificates for authentication.

Further, the SM-DP+ 104 may transmit a signal to or receive a signal from the SM-DS 108 to transfer information necessary for profile download initiation.

Further, the SM-DP+ 104 may perform a certificate-based authority verification operation in managing the eUICC. Here, an SM-DP+ certificate may represent a business entity, such as an MNO or a terminal manufacturer. The eUICC 102 may verify an eUICC management operation performed by the SM-DP+ 104 based on the SM-DP+ certificate.

Further, the SM-DP+ 104 may perform a profile management operation. For example, the profile management operation may include a profile management operation, such as Profile Download, Profile Enable, Profile Disable, Profile Deletion, and the like.

In addition, the SM-DP+ 104 may generate a profile package and perform an encryption operation. The SM-DP+ 104 prepares profile packages and stores the profile packages and profile protection keys for securing the profile packages. Further, the SM-DP+ 104 may allocate EIDs to the profile packages.

The SM-DS 108 assists in an operation of searching for SM-DP+ that the eUICC 102 should connect to process a pending eUICC management event. Further, the SM-DS 108 may perform an operation to transfer an eUICC management event to the eUICC 102 by using a push scheme in the IP network.

The terminal 100 may transmit a signal to or receive a signal from the SM-DP+ 104 to transmit or receive information necessary for profile download initiation.

The MNO system 110 may order the SM-DP+ 104 to prepare a profile package for a specific eUICC and may transfer the profile package to the SM-DP+ 104. Further, the MNO system 110 may transmit, to the eUICC 102, a signal for updating and managing an enabled profile within the eUICC 102.

A secure channel may be established between the SM-DP+ 104 and the eUICC 102. For example, the secure channel may be used during profile download and installation. Further, a secure channel may be used between the SM-DP+ 104 and the terminal 100 in connection with profile transmission. The terminal 100 may transfer the profile package to the eUICC 102.

In an embodiment of the present disclosure, the profile includes, for example, a subscriber identifier (e.g., International Mobile Subscriber Identity, hereinafter, referred to as "IMSI") and an encryption key (e.g., K) for authentication. Further, the profile may include various kinds of information for a communication service provided by a corresponding communication service provider. Here, it should be noted that there is no specific limitation on various kinds of information for the communication service.

Further, in an embodiment of the present disclosure, the SM-DP+ 104 is configured by a single configuration unit, but may be configured in a form including a Profile Provider (hereinafter, referred to as "Profile Provider") and an eUICC Manager (hereinafter, referred to as "eUICC Manager"). The profile provider has a private key and a certificate issued by the CI and the sub-CI of the CI, and may generate a profile package and perform an encryption operation. Further, the eUICC Manager may perform the operation of the SM-DP+ 140, described above, except for an operation performed by the Profile Provider.

FIG. 1 has shown an example of a structure of a wireless communication system according to an embodiment of the present disclosure. Next, another example of a structure of a wireless communication system according to an embodiment of the present disclosure will be described with reference to FIG. 2.

Figure 2:
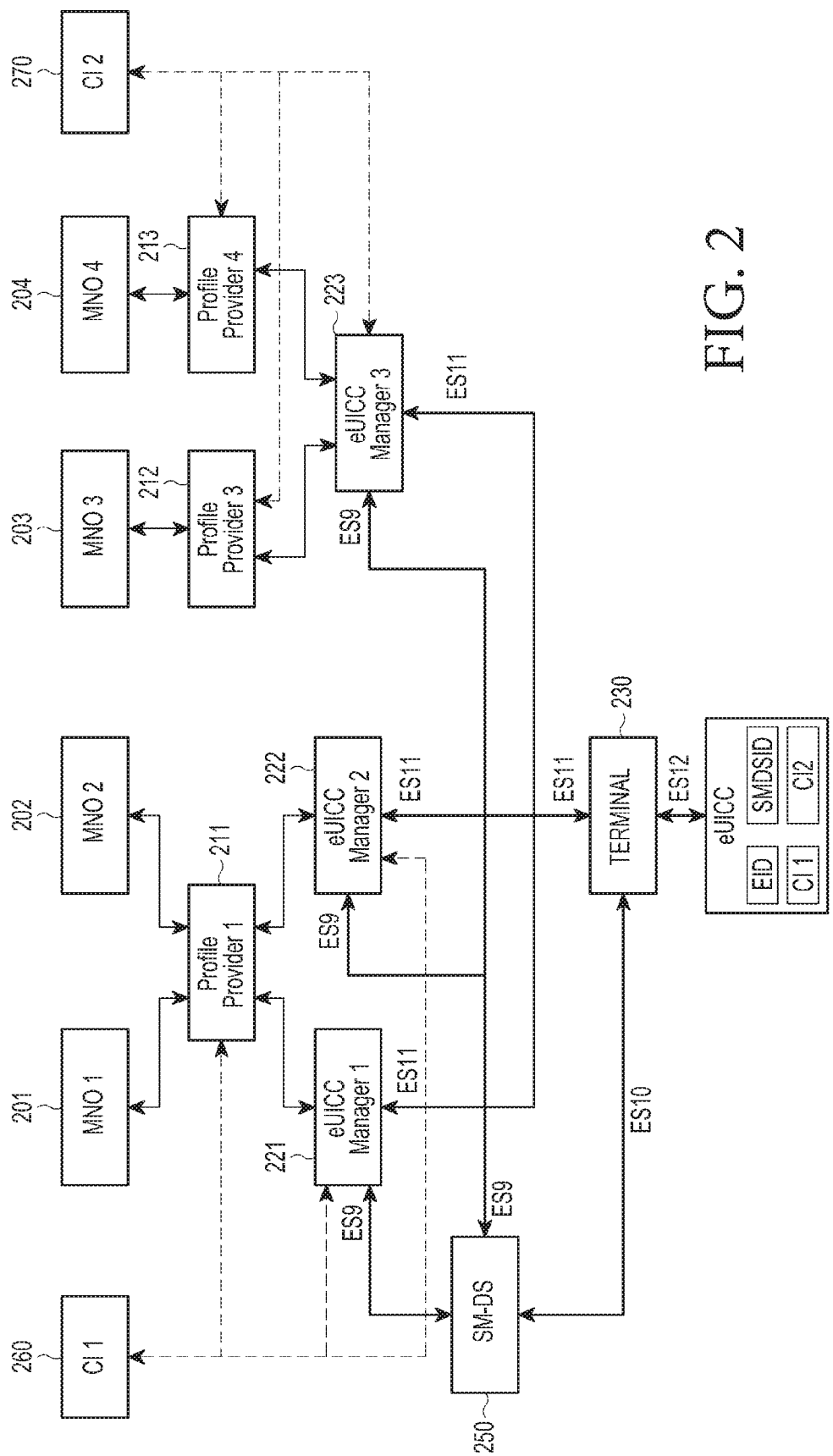
FIG. 2 is a diagram schematically illustrating another example of a structure of a wireless communication system according to an embodiment of the present disclosure.

FIG. 2 is a diagram schematically illustrating another example of a structure of a wireless communication system according to an embodiment of the present disclosure.

Referring to FIG. 2, a plurality of MNO systems, for example, MNO1 201, MNO2 202, MNO3 203, and MNO4 204, may be individually linked to a Profile Provider. Here, each Profile Provider may be linked to a single MNO Business-Support-System (hereinafter, referred to as "BSS") or may be linked to a plurality of MNO BSSs (hereinafter, referred to as "MNO" for convenience).

FIG. 2 illustrates, as an example, that MNO1 201 and MNO2 202 are linked to Profile Provider1 211, MNO3 203 is linked to Profile Provider3 212, and MNO4 204 is linked to Profile Provider4 213.

Meanwhile, a single eUICC Manager may be linked to a single Profile Provider or to a plurality of Profile Providers. FIG. 2 illustrates, as an example, that eUICC Manager1 221 and eUICC Manager2 222 are linked to the Profile Provider1 211, and eUICC Manager3 223 is linked to Profile Provider3 212 and Profile Provider4 213.

A single terminal 230 may be linked to a plurality of eUICC Managers (for example, eUICC Manager1 221, eUICC Manager2 222, and eUICC Manager3 223). Here, the eUICC 240 stores a plurality of CI certificates or CI public keys and may thus authenticate a Profile Provider or an eUICC Manager directly issued from a corresponding CI or through a sub-CI.

Further, an SM-DS 250 may provide a function of selecting an eUICC Manager necessary for the terminal 230 by linking with a plurality of eUICC Managers (for example, eUICC Manager1 221, eUICC Manager2 222, and eUICC Manager3 223). Here, after necessary information is stored in the SM-DS 250, a scheme (Push) of directly notifying of the necessary information to the terminal 230 or a scheme (Pull) of reading, by the terminal, information stored in the SM-DS 250 may be possible.

FIG. 2 has shown another example of an internal structure of a wireless communication system according to an embodiment of the present disclosure. Next, an example of a profile download procedure in a wireless communication system according to an embodiment of the present disclosure will be described with reference to FIG. 3.

Figure 3:
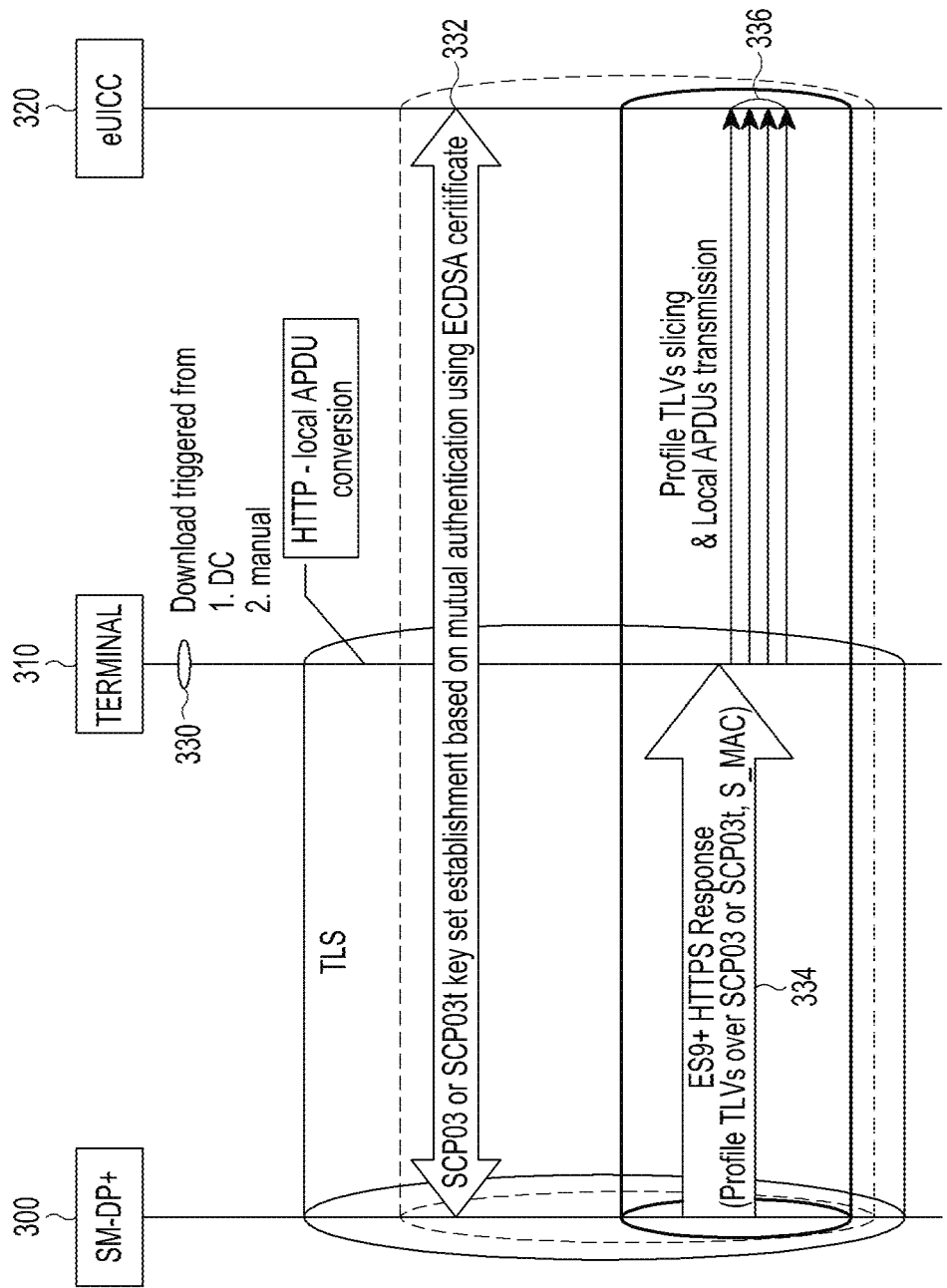
FIG. 3 is a diagram schematically illustrating an example of a profile download procedure in a wireless communication system according to an embodiment of the present disclosure.

FIG. 3 is a diagram schematically illustrating an example of a profile download procedure in a wireless communication system according to an embodiment of the present disclosure.

Referring to FIG. 3, the wireless communication system includes a SM-DP+ 300, a terminal 310, and an eUICC 320.

First, in step 330, profile download may be initiated by notification to the terminal 310 by SM-DS, selected by operating the terminal 310 by a user, or initiated based on information that the terminal 310 previously had requested and received from the SM-DS. Here, the information that the terminal 310 previously had requested and received from the SM-DS may include a delimiter capable of distinguishing an SM-DP+ address and initiating of the profile download, and the like. In this case, the terminal 310 may request profile download from the SM-DP+ 300 corresponding to the SM-DP+ address.

The terminal 310 and the SM-DP+ 300 may perform communication based on a Hypertext Transfer Protocol over Secure Socket Layer (HTTPS) secured by a Transport Layer Security (hereinafter, referred to as "TLS") certificate.

if profile download is initiated in the terminal 310, in step 332, the SM-DP+ 300 configures an SCP03 key set or an SCP03t key set based on mutual authentication using the eUICC 320 and an Embedded UICC Controlling Authority Security Domain (hereinafter, referred to as "ECASD") certificate. As such an operation is performed, a key set of identical symmetric keys is generated in the SM-DP+ 300 and the eUICC 320.

The mutual authentication procedure and the key set generation procedure, using the ECASD certificate, may be similar to a Scenario #3 procedure introduced in the Global Platform Card Security Upgrade for Card Content Management Card Specification v2.2-Amendment E V1.0 standard or a Scenario #3 procedure mentioned in the GSMA Remote Provisioning Architecture for Embedded UICC Technical Specification Version 1.0. Therefore, detailed descriptions thereof will be omitted.

After the key set of identical symmetric keys is generated, the SM-DP+ 300 may cause an SCP03 session or an SCP03t session to be generated by transmitting an update initialization (hereinafter, referred to as "INITIALIZE UPDATE") command and an external authentication (hereinafter, referred to as "EXTERNAL AUTHENTICATE") command to the eUICC 320 by using the key set.

After that, the SM-DP+ 300 may perform encrypted communication with the eUICC 320 using a session key set generated at the time of session generation. The SM-DP+ 300 may generate profile information in a Tag-Length-Value (TLV) form. The TLV data may be protected using one or more security methods of encryption and integrity protection. Here, the security method may be a security method using the session key set generated at the time of session generation. In step 334, the SM-DP+ 300 transmits the profile information in the TLV form encrypted by the SCP03 or the SCP03t to the terminal 310. The profile information transmitted to the terminal 310 may be included in an ES9+ HTTPS response message and transmitted to the terminal 310. The ES9+ HTTPS response message may further include a Session Key for message MAC generation/verification (S-MAC).

The terminal 310 having received the profile information divides the profile information into a data size transmittable to the eUICC 320, then in step 336, includes the divided profile information in a profile load (hereinafter, referred to as "PROFILE LOAD") command, and transmits the profile load command to the eUICC 320.

The eUICC 320 may receive at least one PROFILE LOAD command from the terminal 310, perform a decryption operation and an integrity verification operation, and then install a profile. In FIG. 3, the eUICC 320 is assumed to receive a plurality of PROFILE LOAD commands from the terminal 310.

Further, although not shown separately in FIG. 3, the eUICC 320 may perform, after receiving all the plurality of PROFILE LOAD commands, a decryption operation and an integrity verification operation and complete profile download and installation, or the eUICC 320 may separately receive and process the plurality of PROFILE LOAD commands and then complete profile download and installation.

In addition, in the profile download procedures, the procedures of mutual authentication between the SM-DP+ 300 and the eUICC 320 and key generation, SCP03 or SCP03t session generation, and profile information transfer using the SCP03 or SCP03t session key set may be sequentially performed as described in FIG. 3, but may be implemented in a scheme where the SM-DP+ 300 acquires the certificate of the eUICC 320 and stores both a pre-generated Application Protocol Data Unit (hereinafter, referred to as "APDU") and encrypted profile information in the terminal 310, and then the terminal 310 transfers the stored APDU and encrypted profile information to the eUICC 320 in APDU units.

Meanwhile, although FIG. 3 illustrates an example of a profile download procedure in a wireless communication system according to an embodiment of the present disclosure, various modifications may be made to FIG. 3. For example, although successive steps are illustrated in FIG. 3, the steps illustrated in FIG. 3 may overlap each other, may be performed in parallel, may be performed in a different order, or may be performed several times.

FIG. 3 has described an example of a profile download procedure in a wireless communication system according to an embodiment of the present disclosure. Next, another example of a profile download procedure in a wireless communication system according to an embodiment of the present disclosure will be described with reference to FIG. 4.

Figure 4:
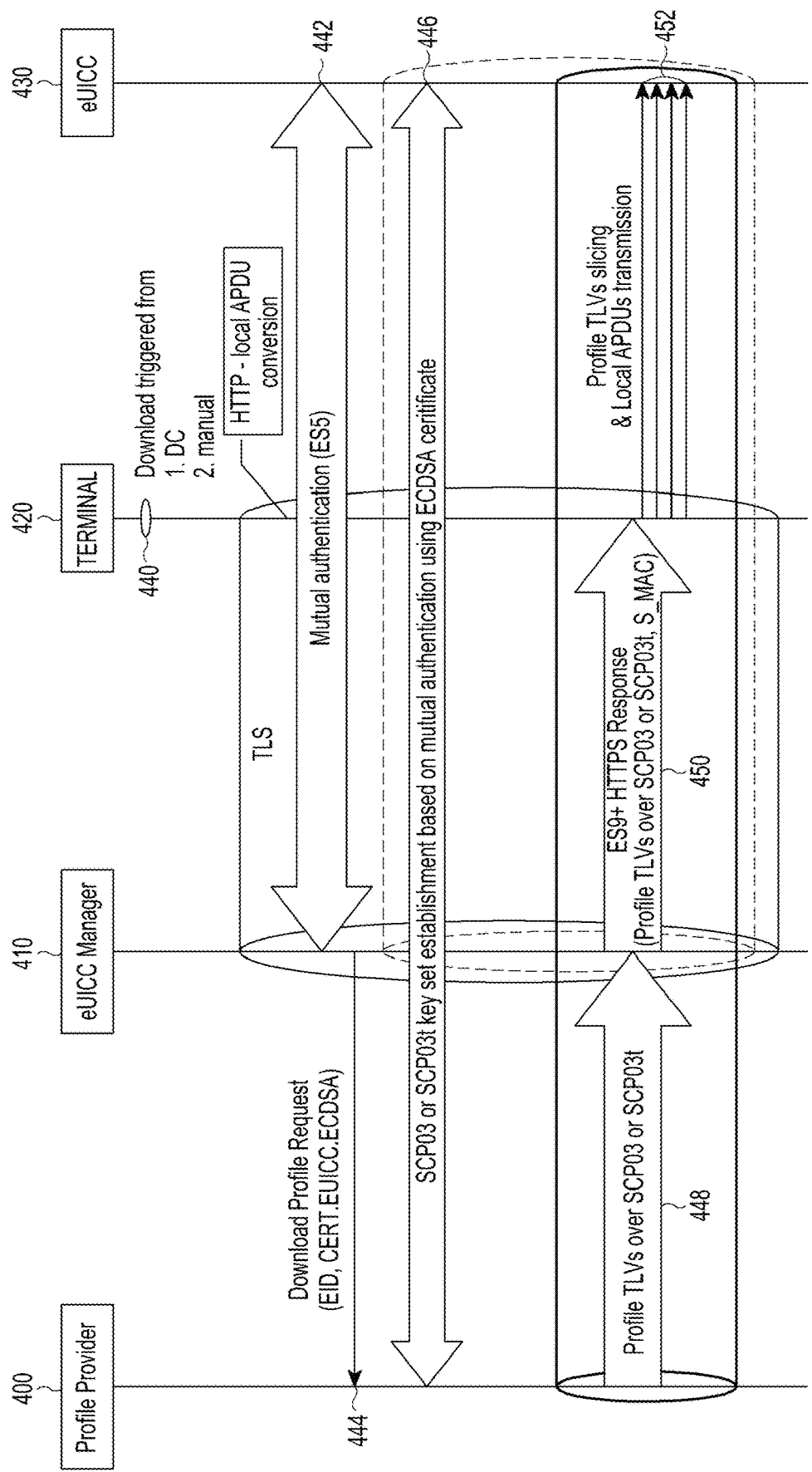
FIG. 4 is a diagram schematically illustrating another example of a profile download procedure in a wireless communication system according to an embodiment of the present disclosure.

FIG. 4 is a diagram schematically illustrating another example of a profile download procedure in a wireless communication system according to an embodiment of the present disclosure. Referring to FIG. 4, the wireless communication system includes a Profile Provider 400, an eUICC Manager 410, a terminal 420, and an eUICC 430.

First, in step 440, profile download may be initiated by notification to the terminal 420 by SM-DS, selected by operating the terminal 420 by a user, or initiated based on information that the terminal 420 previously had requested and received from the SM-DS. Here, the information that the terminal 420 previously had requested and received from the SM-DS may include a delimiter capable of distinguishing an eUICC Manager address and initiating of the profile download, and the like. In this case, the terminal 420 may request profile download from the eUICC Manager 410 corresponding to the eUICC Manager address. The terminal 420 and the eUICC Manager 410 may perform communication based on HTTPS secured by a TLS certificate.

The terminal 420 initiates a mutual authentication procedure between the eUICC Manager 410 and the eUICC 430, in step 442. Hereinafter, details of the mutual authentication procedure will be provided with reference to FIG. 5.

if the mutual authentication procedure is performed, the eUICC Manager 410 may transfer a profile download request (hereinafter, referred to as "Download Profile Request") message to the Profile Provider 400, in step 444. Here, the Download Profile Request message may include an EID and an eUICC certificate (CERT.EUICC.ECDSA).

The Profile Provider 400 having received the Download Profile Request message from the eUICC Manager 410 may configure, in step 446, an SCP03 key set or an SCP03T key set based on the mutual authentication using the ECASD certificate and the eUICC 430 corresponding to the EID included in the Download Profile Request message. As such an operation is performed, a key set of identical symmetric keys is generated in the Profile Provider 400 and the eUICC 430.

The mutual authentication procedure and the key set generation procedure, using the ECASD certificate, may be similar to a Scenario #3 procedure introduced in the Global Platform Card Security Upgrade for Card Content Management Card Specification v2.2-Amendment E V1.0 standard or a Scenario #3 procedure mentioned in the GSMA Remote Provisioning Architecture for Embedded UICC Technical Specification Version 1.0. Therefore, detailed descriptions thereof will be omitted.

Meanwhile, the Profile Provider 400 may cause an SCP03 session or an SCP03t session to be generated by transmitting an INITIALIZE UPDATE command and an EXTERNAL AUTHENTICATE command to the eUICC 430 by using the key set.

After that, the Profile Provider 400 may perform encrypted communication with the eUICC 430 using a session key set generated at the time of session generation. The Profile Provider 400 may generate profile information in a Tag-Length-Value (TLV) form. The TLV data may be protected using one or more security methods of encryption and integrity protection. Here, the security method may be a security method using the session key set generated at the time of session generation.

In step 448, the Profile Provider 400 transmits the profile information in the TLV form to the eUICC Manager 410 by using the SCP03 or the SCP03t. Then, in step 450, the eUICC Manager 410 may transmit information including a part or all of the profile information to the terminal 420. In FIG. 4, it is assumed that the eUICC Manager 410 transfers, as it is, the profile information received from the Profile Provider 400 to the terminal 420.

In step 452, the terminal 420 having received the profile information from the eUICC Manager 410 divides the profile information into a data size transmittable to the eUICC 430, includes the divided profile information in a PROFILE LOAD command, and transmits the PROFILE LOAD command to the eUICC 430.

The eUICC 430 may receive at least one PROFILE LOAD command from the terminal 420, perform a decryption operation and an integrity verification operation, and then install a profile. In FIG. 4, the eUICC 430 is assumed to receive a plurality of PROFILE LOAD commands from the terminal 420.

Further, although not shown separately in FIG. 4, the eUICC 430 may perform, after receiving all the plurality of PROFILE LOAD commands, a decryption operation and an integrity verification operation and complete profile download and installation, or the eUICC 430 may separately receive and process the plurality of PROFILE LOAD commands and then complete profile download and installation.

In addition, in the profile download procedures, the procedures of mutual authentication between the Profile Provider 400 and the eUICC 430 and key generation, SCP03 or SCP03t session generation, and profile information transfer using the SCP03 or SCP03t session key set may be sequentially performed as described in FIG. 4, but may be implemented in a scheme of, after acquiring the certificate of the eUICC 430 by the Profile Provider 400, transferring a pre-generated APDU and encrypted profile information to the eUICC Manager 410, storing both of the transferred APDU and encrypted profile information in the terminal 420, and then transferring the stored APDU and encrypted profile information to the eUICC 430 in APDU units.

Meanwhile, although FIG. 4 illustrates another example of a profile download procedure in a wireless communication system according to an embodiment of the present disclosure, various modifications may be made to FIG. 4. For example, although successive steps are illustrated in FIG. 4, the steps illustrated in FIG. 4 may overlap each other, may be performed in parallel, may be performed in a different order, or may be performed several times.

Figure 5:
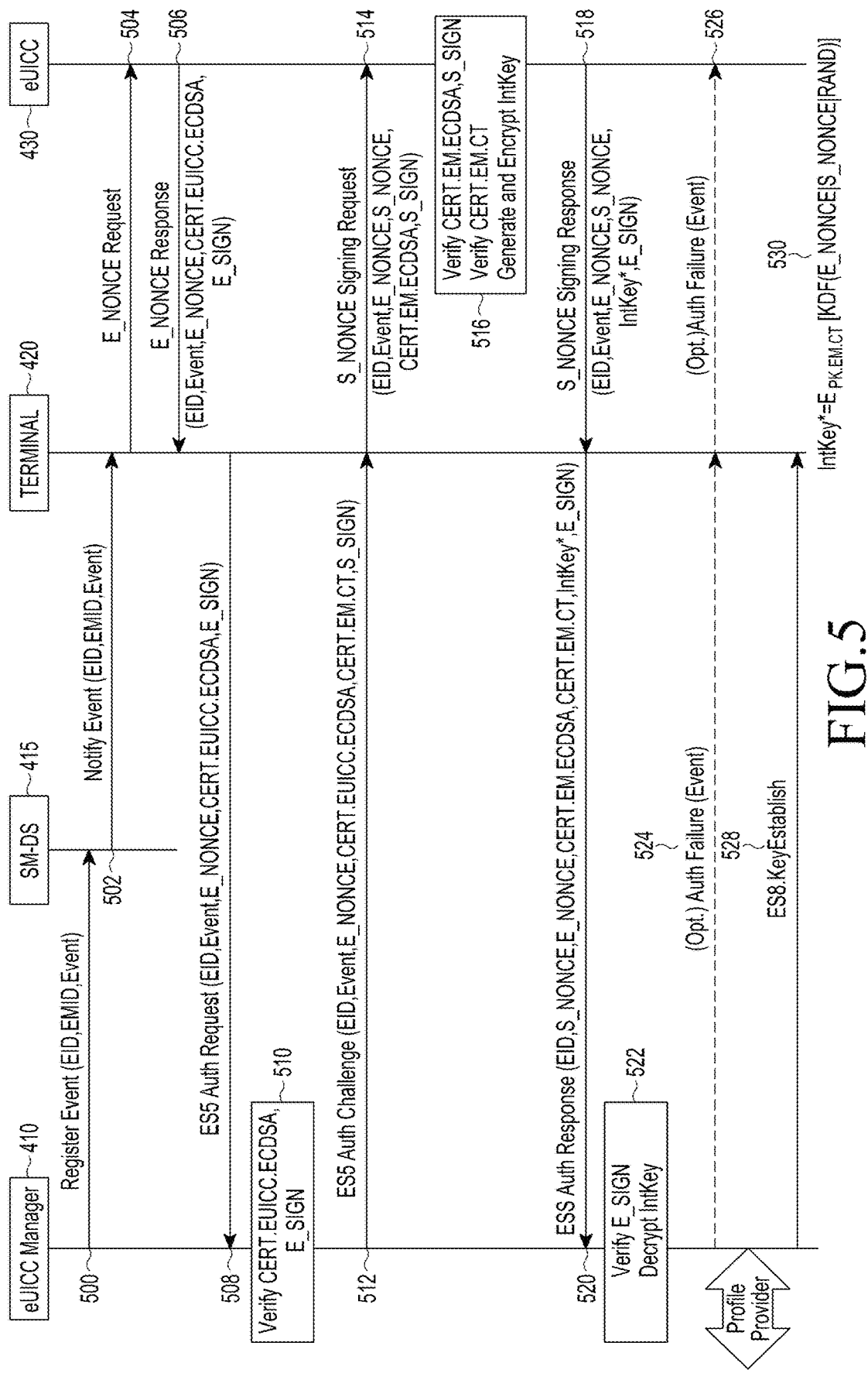
FIG. 5 is a diagram schematically illustrating a mutual authentication procedure performed between an eUICC Manager and an eUICC in a wireless communication system according to an embodiment of the present disclosure.

FIG. 4 has shown another example of a profile download procedure in a wireless communication system according to an embodiment of the present disclosure. Next, the mutual authentication procedure of step 442 performed between the eUICC Manager 410 and the eUICC 430 will be described with reference to FIG. 5 as follows. FIG. 5 is a diagram schematically illustrating a mutual authentication procedure performed between an eUICC Manager and an eUICC in a wireless communication system according to an embodiment of the present disclosure.

Referring to FIG. 5, the wireless communication system is the same as the wireless communication system illustrated in FIG. 4, and further includes SM-DS 415.

First, in step 500, the eUICC Manager 410 transfers a registration event (hereinafter, referred to as "Register Event") message to the SM-DS 415. The Register Event includes an EID and eUICC Manager address information, or an eUICC Manager Identifier (hereinafter, referred to as "EMID"). Additionally, the Register Event message may include an Event indicating initiating of profile download.

The SM-DS 415 may store information included in the Register Event message, for example, EID, EMID, and Event, and transfer, in step 502, an event notification (hereinafter, referred to as "Notify_Event") message to the terminal 420. Here, the Notify_Event message may include EID, EMID, and Event. Here, the Event may be information including an Event ID and an event type (hereinafter, referred to as "Event Type"). The Event ID may be an identifier distinguishing an event, and may have a globally unique value. Further, the Event Type may include a value for distinguishing an event, such as Profile Download, etc.

The terminal 420 having received the Notify_Event message from the SM-DS 415 may transfer, in step 504, an E_NONCE request (hereinafter, referred to as "E_NONCE Request") message to the eUICC 430. Here, the E_NONCE Request message may be transferred to the eUICC 430, for example, in an APDU command form.

If the E_NONCE Request message is received from the terminal 420, the eUICC 430 generates a random value of E_NONCE. Further, in step 506, the eUICC 430 transfers, to the terminal 420, an E_NONCE response (hereinafter, referred to as "E_NONCE Response") message including EID, Event, a certificate of the eUICC 430, and an E_SIGN value signed using a private key of the eUICC 430.

In step 508, the terminal 420 may transfer, to eUICC Manager 410, an ES5 authentication request (hereinafter, referred to as "ES5 Auth Request") message by using the E_NONCE Response message received from the eUICC 430. Here, the ES5 Auth Request message transferred to the eUICC Manager 410 by the terminal 420 may include a part or all of the E_NONCE Response message transferred from the eUICC 430. It should be noted that forms in which the E_NONCE Response message is included in the ES5 Auth Request message may be various.

In step 510, the eUICC Manager 410 having received the ES5 Auth Request message from the terminal 420 may verify the eUICC certificate and signature, which are included in the received ES5 Auth Request message, by using one of a public key of a CI and a CI certificate, which are stored in the eUICC Manager 410. Then, the eUICC Manager 410 may randomly generate an S_NONCE value, and may transfer, in step 512, an ES5 authentication challenge (hereinafter, referred to as "ES5 Auth Challenge") message including the eUICC Manager certificate and an eUICC Manager sign value of S_SIGN, to the terminal 420. Here, the S_SIGN may refer to a value obtained by signing information including the EID, the E_NONCE, and the S_NONCE with a private key of the eUICC Manager 410.

The terminal 420 may transfer, in step 514, a S_NONCE signing request (hereinafter, referred to as "S_NONCE Signing Request") message to the eUICC 430 by using the ES5 Auth Challenge message received from the eUICC Manager 410. Here, the S_NONCE Signing Request message transferred to the eUICC 430 from the terminal 420 may include a part of all of the ES5 Auth Challenge message transferred from the eUICC Manager 410. It should be noted that forms in which the ES5 Auth Challenge message is included in the S_NONCE Signing Request message may be various.

In step 516, the eUICC 430 may verify the eUICC Manager certificate included in the ES5 Auth Challenge message included in the S_NONCE Signing Request message, by using a public key or a CI certificate stored in the eUICC 430. Therefore, if verification of the certificate is successful, the eUICC 430 verifies the S_SIGN value and a message using the public key included in the eUICC Manager certificate. The eUICC 430 verifies whether the S_SIGN value is calculated using the private key of the eUICC Manager 410 and the E_NONCE value.

If the eUICC 430 fails an operation of the verification, the eUICC 430 transfers an S_NONCE signing response (hereinafter, referred to as "NONCE Signing Response") to the terminal 420. Here, the NONCE Signing Response message may include a status word value indicating that the operation of the verification has failed.

On the other hand, if the eUICC 430 succeeds in the operation of the verification, the eUICC 430 may transmits, in step 518, the S_NONCE Signing Response message to the terminal, and complete an authentication operation for the eUICC Manager.

Meanwhile, the S_NONCE Signing Response message may include the E_SIGN, that is a value obtained by signing information including the S_NONCE value with a private key of the eUICC. The information including the S_NONCE value may include IntKey*. The IntKey* may be a value obtained by encrypting an integrity protect (hereinafter, referred to as "Integrity Protect") key used for integrity verification after completion of the authentication procedure, by using a public key of the eUICC Manager certificate.

The terminal 420 may transfer, in step 520, the ES5 Auth Response message including a part or all of the S_NONCE Signing Response message to the eUICC Manager 410. Here, it should be noted that forms in which the S_NONCE Signing Response message is included in the ES5 Auth Response message may be various.

The eUICC Manager 410 having received the ES5 Auth Response message from the terminal 420 may verify, in step 522, an E_SIGN value using a public key of the eUICC 430. The eUICC Manager 410 may complete authentication of the eUICC 430 if it is verified that the E_SIGN value is calculated using the private key of the eUICC and the S_NONCE value.

Further, the eUICC Manager 410 may decrypt the IntKey* by using the private key of the eUICC Manager 410, and thus extract an IntKey value. Then, in step 528, the eUICC manager 410 transmits, to the terminal 420, data to be transferred to the eUICC 430 based on the IntKey value. The terminal 420 transfers the received data to the eUICC 430, and the eUICC 430 decrypts the data based on an IntKey value extracted by decrypting the IntKey* in step 530. Likewise, data transferred from the eUICC Manager 410 to the eUICC 430 through the terminal 420 may guarantee integrity protection using the IntKey value.

Meanwhile, if verification by the eUICC Manager 410 fails, the eUICC Manager 410 may transfer an authentication failure (hereinafter, referred to as "Auth Failure") message to the terminal 420 in step 524. Here, it should be noted that an operation of transmitting the Auth Failure message to the terminal 420 by the eUICC Manager 410 may be selectively performed.

If the Auth Failure message is received from the eUICC Manager 410, the terminal 420 may transfer, in step 526, an Auth Failure message including a part or all of the Auth Failure to the eUICC 430. Here, it should be noted that forms in which the Auth Failure message received by the terminal 420 from the eUICC Manager 410 is included in the Auth Failure message to be transmitted to the eUICC 430 by the terminal 420 may be various.

Meanwhile, after completion of the authentication procedure as described above, the eUICC Manager 410 may transmit a Download Profile Request message to the Profile Provider 400, as illustrated in step 444 in FIG. 4.

Although FIG. 5 illustrates a mutual authentication procedure performed between the eUICC Manager 410 and the eUICC 430 in a wireless communication system according to an embodiment of the present disclosure, it should be noted that various modifications may be achieved with respect to FIG. 5. For example, although successive steps are illustrated in FIG. 5, the steps illustrated in FIG. 5 may overlap each other, may be performed in parallel, may be performed in a different order, or may be performed several times.

FIG. 5 has described a mutual authentication procedure performed between the eUICC Manager and the eUICC 430 in a wireless communication system according to an embodiment of the present disclosure. Next, another example of a profile download procedure in a wireless communication system according to an embodiment of the present disclosure will be described with reference to FIG. 6.

Figure 6:
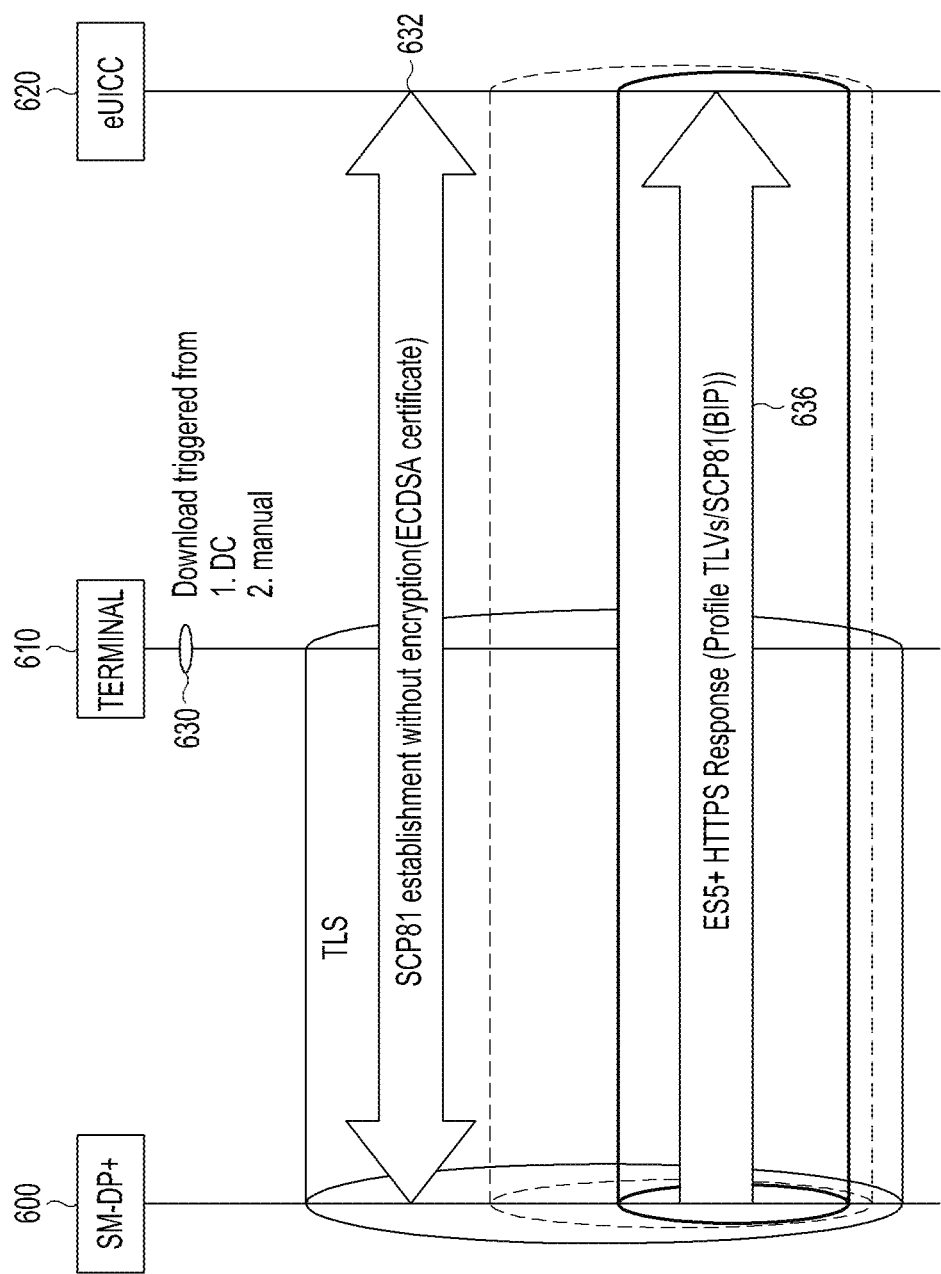
FIG. 6 is a diagram schematically illustrating still another example of a profile download procedure in a wireless communication system according to an embodiment of the present disclosure.

FIG. 6 is a diagram schematically illustrating still another example of a profile download procedure in a wireless communication system according to an embodiment of the present disclosure.

Referring to FIG. 6, the wireless communication system includes an SM-DP+ 600, a terminal 610, and an eUICC 620.

In step 630, profile download may be initiated by notification to the terminal 610 by SM-DS, selected by operating the terminal 610 by a user, or initiated based on information that the terminal 610 previously had requested and received from the SM-DS. Here, the information that the terminal 610 previously had requested and received from the SM-DS may include a delimiter capable of distinguishing an SM-DP+ address and initiating of the profile download, and the like. In this case, the terminal 610 may request profile download from the SM-DP+ 600 corresponding to the SM-DP+ address.

In step 632, the SM-DP+ 600 and the eUICC 620 configures a Secure Channel Protocol (SCP)81 session. As described above, unlike the file download procedure illustrated in FIG. 3, the file download procedure illustrated in FIG. 6 uses SCP81 for mutual authentication and integrity protection between the SM-DP+ 600 and the eUICC 620. The SCP81 may use an HTTPS protocol in order to perform communication between the SM-DP+ 600 and the eUICC 620, and the terminal 610 and the eUICC 620 may use a Bearer Independent Protocol (hereinafter, referred to as "BIP").

Here, unidirectional authentication or mutual authentication using a certificate may be used for TLS authentication used when the SCP81 is used. if a cipher suite (hereinafter, referred to as "Cipher_suite") used for the TLS authentication is configured, data information transferred to the SCP81 protocol may be protected as follows.

A mutual authentication operation is performed, an Integrity Protect operation is not performed, and an encryption (hereinafter, referred to as "Encryption") is not performed A mutual authentication operation is performed, an Integrity Protect operation is performed, and an Encryption is not performed.

A mutual authentication operation is performed, an Integrity Protect operation is not performed, and an Encryption is performed.

A mutual authentication operation is performed, an Integrity Protect operation is performed, and an Encryption is performed.

After the SCP81 session is generated, the SM-DP+ 600 may transfer profile information in a TLV form to the eUICC 620 through the SCP81 session in step 636.

Meanwhile, although FIG. 6 illustrates another example of a profile download procedure in a wireless communication system according to an embodiment of the present disclosure, various modifications may be made to FIG. 6. For example, although successive steps are illustrated in FIG. 6, the steps illustrated in FIG. 6 may overlap each other, may be performed in parallel, may be performed in a different order, or may be performed several times.

FIG. 6 has described another example of a profile download procedure in a wireless communication system according to an embodiment of the present disclosure. Next, still another example of a profile download procedure in a wireless communication system according to an embodiment of the present disclosure will be described with reference to FIG. 7.

Figure 7:
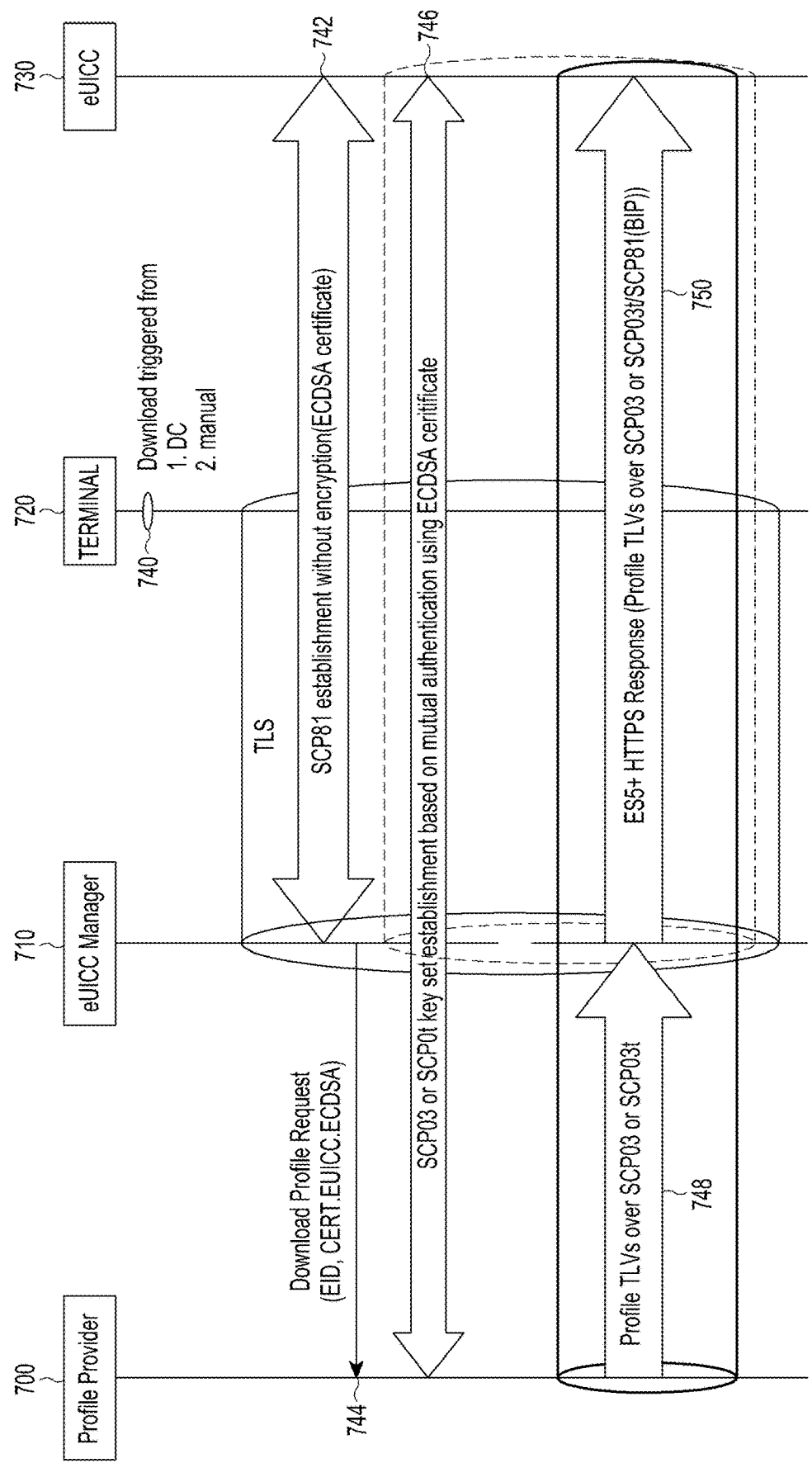
FIG. 7 is a diagram schematically illustrating still another example of a profile download procedure in a wireless communication system according to an embodiment of the present disclosure.

FIG. 7 is a diagram schematically illustrating still another example of a profile download procedure in a wireless communication system according to an embodiment of the present disclosure.

Referring to FIG. 7, the wireless communication system includes a Profile Provider 700, an eUICC Manager 710, a terminal 710, and the eUICC 730.

In step 740, profile download may be initiated by notification to the terminal 720 by SM-DS, selected by operating the terminal 720 by a user, or initiated based on information that the terminal 720 previously had requested and received from the SM-DS. Here, the information that the terminal 720 previously had requested and received from the SM-DS may include a delimiter capable of distinguishing an eUICC Manager address and initiating of the profile download, and the like. In this case, the terminal 720 may request profile download from the eUICC Manager 710 corresponding to the eUICC Manager address. In step 742, the eUICC Manager 710 and the eUICC 730 configure a SCP81 session. As described above, unlike the file download procedure illustrated in FIG. 4, the file download procedure illustrated in FIG. 7 uses SCP81 for mutual authentication and integrity protection between the SM-DP+ 600 and the eUICC 620.

After the SCP81 session is generated, the eUICC Manager 710 may transfer a Download Profile Request message to the Profile Provider 700, in step 744. Here, the Download Profile Request message may include an EID and an eUICC certificate (CERT.EUICC.ECDSA).

The Profile Provider 700 having received the Download Profile Request message from the eUICC Manager 710 may configure an SCP03 key set or an SCP03T key set based on the mutual authentication using the ECASD certificate and the eUICC 730 corresponding to the EID included in the Download Profile Request message. Here, an authentication message transmitted or received between the Profile Provider 700 and the eUICC 730, etc. may be transferred by the eUICC Manager 710 through the SCP81.

After the SCP03 key set or the SCP03t key set between the Profile Provider 700 and the eUICC 730 are generated, an SCP03 session key set or an SCP03t session key set may be generated between the Profile Provider 700 and the eUICC 730. In step 748, the Profile Provider 700 may transfer profile information in a TLV form, which is encrypted with the SCP03 key set or the SCP03t key set, to the eUICC Manager 710. Then, in step 750, the eUICC Manager 710 may transfer the profile information of the TLV form, encrypted with the SCP03 key set or the SCP03t key set, to the eUICC 730 through the SCP81.

Meanwhile, although not shown separately in FIG. 7, generation of the SCP03 key set or the SCP03t key set and generation of APDU and session key for mutual authentication of the SCP03 and the SCP03t may be performed through an end-to-end (hereinafter, referred to as "end to end") message exchange between the Profile Provider 700 and the eUICC 730. However, it may also be possible that the Profile Provider 700 generates an APDU message based on a certification of the eUICC 730 in advance, transfers the generated APDU message to the eUICC Manager 710, and then directly transfers the transferred APDU message to the eUICC 730 through the SCP81.

Meanwhile, although FIG. 7 illustrates another example of a profile download procedure in a wireless communication system according to an embodiment of the present disclosure, various modifications may be made to FIG. 7. For example, although successive steps are illustrated in FIG. 6, the steps illustrated in FIG. 7 may overlap each other, may be performed in parallel, may be performed in a different order, or may be performed several times.

FIG. 7 has shown another example of a profile download procedure in a wireless communication system according to an embodiment of the present disclosure. Next, a procedure of downloading a profile from an MNO system to a terminal in a wireless communication system according to an embodiment of the present disclosure will be described with reference to FIG. 8.

Figure 8:
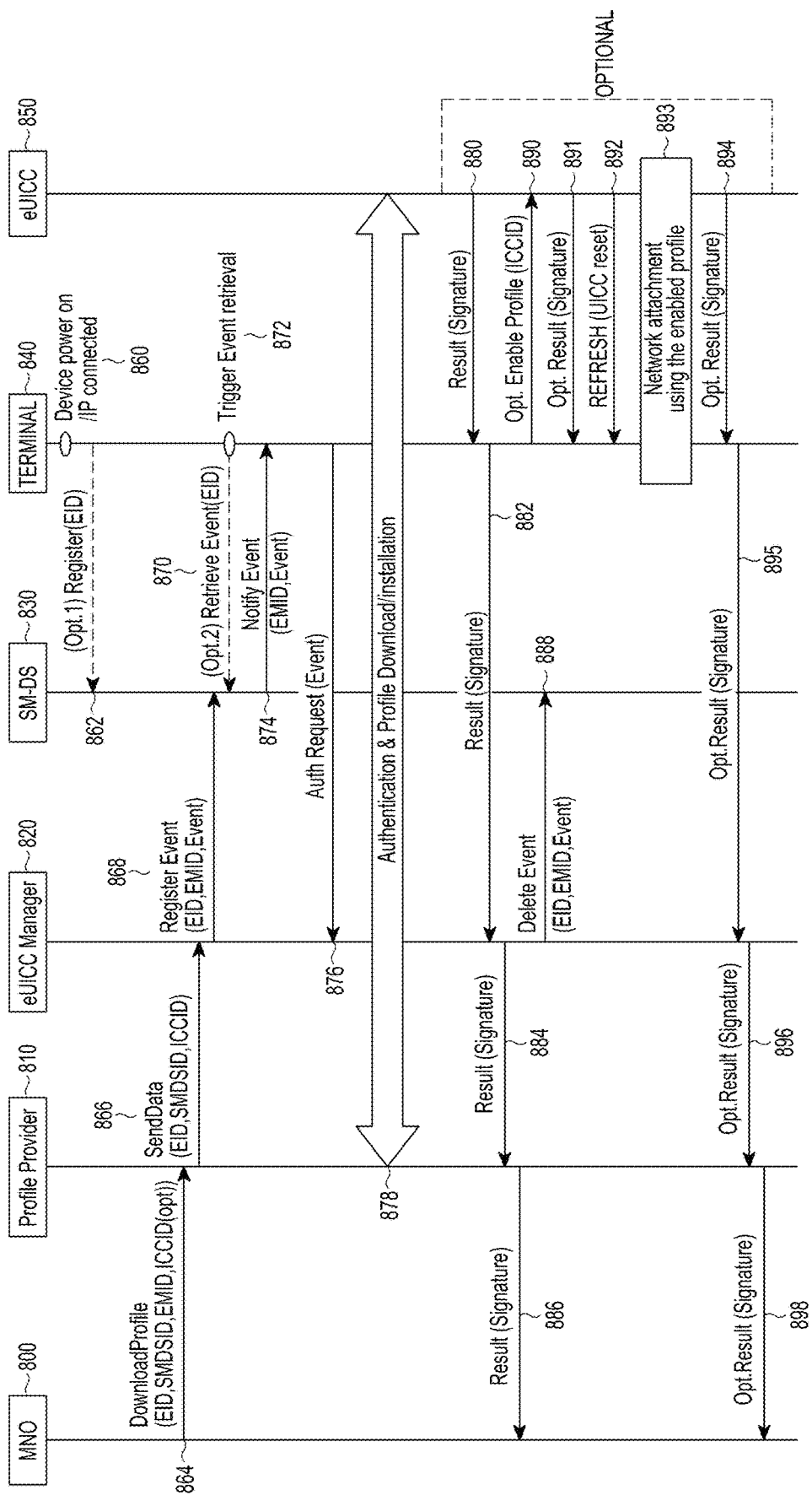
FIG. 8 is a diagram schematically illustrating a procedure of downloading a profile from an MNO system to a terminal in a wireless communication system according to an embodiment of the present disclosure.

FIG. 8 is a diagram schematically illustrating a procedure of downloading a profile from an MNO system to a terminal in a wireless communication system according to an embodiment of the present disclosure.

Referring to FIG. 8, the wireless communication system includes an MNO system 800, a Profile Provider 810, an eUICC Manager 820, an SM-DS 830, a terminal 840, and an eUICC 850.

In step 864, the MNO system 800 may transfer a profile download (hereinafter, referred to as "DownloadProfile") message to the Profile Provider 810 in order to initiate profile download. The MNO system 800 may be a Business-Support-System (BSS) of an MNO.

The DownloadProfile message may include at least one of EID, SMDSID, EMID, and Profile ID.

The EID is an eUICC identifier, and may have a determined length or a variable length.

The EID may be, for example, a 16-digit number.

The SMDSID may be an SM-DS identifier. The SMDSID may be a server address through which the eUICC Manager 820 or the terminal 840 is able to access the SM-DS 830, or may indicate a value which may be mapped to the server address.

The EMID may be an eUICC Manager identifier. The EMID may be a server address through which the Profile Provider 810, the SM-DS 830, the terminal 840, or the eUICC 850 is able to access the eUICC Manager 820, or may indicate a value which may be mapped to the server address.

The Profile ID may be an identifier for distinguishing a profile. Further, the profile ID may be an Integrated Circuit Card ID (hereinafter, referred to as "ICCID").

Meanwhile, in step 866, the Profile Provider 810 may transfer a SendData message to the eUICC Manager 820 which corresponds to the EMID or preconfigured, by using the EID, SMDSID, and ICCID included in the Download-Profile message.

Then, in step 868, the eUICC Manager 820 may confirm the SMDSID included in the SendData message, and then transfer a Register Event message to the SM-DS 830 corresponding to the SMDSID. The Register Event message may include EMID, EID, and Event. Here, the Event may be information including Event ID and Event Type.

A method of transferring the EMID from the SM-DS 830 to the terminal 840 may be one of the following two methods or both.

If there exists an EID registered through a Register message by the terminal 840 in step 862 (Opt. 1), or a Retrieve Event message including the EID for requesting Event is received in step 870 (Opt. 2), the SM-DS 830 may transfer a Notify Event message to the terminal 840 in step 874. Here, Opt. 1 operation may be performed in step 860 if power of the terminal 840 is turned on and an IP connection is established. Further, Opt. 2 operation may be performed in step 870 if a retrieval trigger event occurs in the terminal 840.

Meanwhile, the Notify Event message may include the EMID and the Event. Then, in step 876, the terminal 840 may transfer an Auth Request message to the eUICC Manager 820 corresponding to the EMID, and perform authentication. At this time, the Auth Request message may include Event received by the eUICC Manager 820.

The eUICC Manager 820 may confirm the Event ID or the Event Type included in the received Event and initiate an additional operation.

In FIG. 8, it is assumed that the Event is Event Type indicating profile download.

Meanwhile, via interworking between the Profile Provider 810, the eUICC Manager 820, the terminal 840, and the eUICC 850, an authentication operation and a profile download/installation operation are performed in step 878. Such operations of performing authentication between the Profile Provider 810, the eUICC Manager 820, the terminal 840, and the eUICC 850, and performing profile download/installation may be included in FIG. 8.

The eUICC 850 may transfer a result including a signature value of the eUICC 850 to the terminal 840 in step 880, and the terminal 840 may transfer the result to the eUICC Manager 820 in step 882. Further, the eUICC Manager 820 may transfer the result to the Profile Provider 810 in step 884, and the Profile Provider 810 may transfer the result to the MNO system 800 in step 886. Alternatively, the eUICC Manager 820 may directly transfer the result to the MNO system 800.

Meanwhile, if processing of the Event is completed, the eUICC Manager 820 may transfer a delete event (hereinafter, referred to as "Delete Event") to the SM-DS 830 in step 888. Then, the SM-DS 830 may delete the registered Event.

In step 890, the terminal 840 may transfer profile enable (hereinafter, referred to as "Enable Profile") having an ICCID value as a factor to the eUICC 850 so as to enable a profile corresponding to the ICCID value.

The eUICC 850 may transfer, in step 891, a result of the profile enable, including a signature value, to the terminal 840 in response to the Enable Profile message. Here, if there is an existing enabled profile, the eUICC 850 may first disable the existing enabled profile and then enable the profile corresponding to the ICCID.

In step 892, the eUICC 850 transmits a REFRESH message to the UE 840. Then, in step 893, the terminal 840 may perform network connection using the newly enabled profile.

In step 894, the eUICC 850 may transfer a result of the network connection using the Enable Profile including the signature value of the eUICC, and the terminal 840 may transfer the result of the network connection using the Enable Profile including the signature value of the eUICC to the eUICC Manager 820 in step 895.

Further, in step 896, the eUICC Manager 820 may transfer the result of the network connection using the Enable Profile including the signature value of the eUICC to the Profile Provider 810, and the Profile Provider 810 may transfer the result of the network connection using the Enable Profile including the signature value of the eUICC to the MNO system 800. Alternatively, the eUICC Manager 820 may directly transfer the result of the network connection using the Enable Profile including the signature value of the eUICC to the MNO system 800.

Meanwhile, steps 880 to 898 of FIG. 8 may be omitted in some cases, and may be selectively performed. Further, in FIG. 8, descriptions are divided into operations of two elements of the Profile Provider 810 and the eUICC Manager 820, but the operations of the Profile Provider 810 and the eUICC Manager 820 may be represented as an operation of a single element of SM-DP+. In this case, a message transmission/reception operation between the Profile Provider 810 and the eUICC Manager 820 may be omitted, and the EMID may also be omitted or replaced with SM-DP+ ID.

Meanwhile, although FIG. 8 illustrates a procedure of downloading a profile from an MNO system to a terminal in a wireless communication system according to an embodiment of the present disclosure, various modifications may be made to FIG. 8. For example, although successive steps are illustrated in FIG. 8, the steps illustrated in FIG. 8 may overlap each other, may be performed in parallel, may be performed in a different order, or may be performed several times.

FIG. 8 has shown a procedure of downloading a profile from an MNO system to a terminal in a wireless communication system according to an embodiment of the present disclosure. Next, an internal configuration diagram of an entity included in a wireless communication system according to an embodiment of the present disclosure will be described with reference to FIG. 9.

Figure 9:
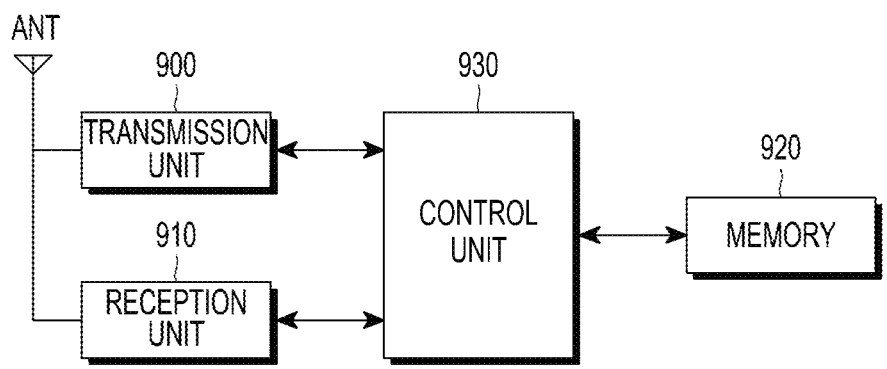
FIG. 9 is an internal configuration diagram of an entity included in a wireless communication system according to an embodiment of the present disclosure.

FIG. 9 is an internal configuration diagram of an entity included in a wireless communication system according to an embodiment of the present disclosure.

An entity included in a wireless communication system according to an embodiment of the present disclosure may be one of an SM-DS, a Profile Provider, an eUICC Manager, a terminal, an SM-DS, an MNO system, and an eUICC.

Referring to FIG. 9, the entity may include a transmission unit 900, a reception unit 910, a memory 920, and a control unit 930.

First, the control unit 930 controls overall operations of the entity. The control unit 930 controls the entity to perform overall operations associated with a profile download operation according to an embodiment of the present disclosure. Here, the operations associated with a profile download operation according to an embodiment of the present disclosure are the same as those described in FIG. 1 to FIG. 8, and detailed descriptions thereof will be thus omitted.

The transmission unit 900 transmits various signals and various messages to entities other than the entity under control of the control unit 930. Here, the various signals and various messages transmitted by the transmission unit 900 are the same as various signals and various messages transmitted in FIG. 1 to FIG. 8, and detailed descriptions thereof will be thus omitted.

Further, the reception unit 910 receives various signals and various messages from entities other than the entity under control of the control unit 930. Here, the various signals and various messages received by the reception unit 910 are the same as various signals and various messages received in FIG. 1 to FIG. 8, and detailed descriptions thereof will be thus omitted.

The memory 920 stores programs and various data necessary for an operation of the entity and, particularly, stores information associated with a profile download operation according to an embodiment of the present disclosure. Further, the memory 920 stores various signals and various messages received by the reception unit 910.

In the above description, the entity is implemented as separate units, such as the transmission unit 900, the reception unit 910, the memory 920, and the control unit 930. However, it is possible that at least two of the transmission unit 900, the reception unit 910, the memory 920, and the control unit 930 are integrated into one unit.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the above may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements. Although the above embodiments have been separately described herein, two or more of them may be implemented in combination.

Further, the above embodiments of the present disclosure may be implemented by a computer-readable code in a computer-readable recording medium. The computer-readable recording medium may be any data storage device capable of storing data which can be read by a computer system. Examples of recording-mediums readable by the computer may include a Read-Only Memory (ROM), a Random-Access Memory (RAM), a Compact Disc-Read Only Memory (CD-ROM), magnetic tapes, floppy disks, optical data storage devices, carrier waves (such as data transmission through the Internet). Further, functional programs, codes and code segments for achieving the present disclosure may be easily interpreted by programmers skilled in the art which the present disclosure pertains to.

It will be appreciated that an apparatus and a device according to embodiments of the present disclosure can be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium. It will be appreciated that the method according to embodiments of the present disclosure may be implemented by a computer, various portable terminals, or a network entity managed by a communication provider in a wireless communication system, which includes/include a controller and a memory, and the memory is an example of a machine-readable storage medium that is suitable to store a program or programs including instructions for implementing the embodiments of the present disclosure.

Accordingly, the present disclosure includes a program for a code implementing the apparatus and method described in the appended claims of the specification and a machine (a computer or the like)-readable storage medium for storing the program.

Although the embodiment has been described in the detailed description of the present disclosure, the present disclosure may be modified in various forms without departing from the scope of the present disclosure. Thus, the scope of the present disclosure shall not be determined merely based on the described exemplary embodiments and rather determined based on the accompanying claims and the equivalents thereto.

The invention claimed is:

1. A method performed by a terminal including an embedded universal integrated circuit card (eUICC) in a communication system, the method comprising:
   identifying an event associated with a profile download from a subscription manager data preparation+ (SM-DP+) to the terminal;

establishing a hypertext transfer protocol over a secure socket layer (HTTPS) connection with the SM-DP+, the HTTPS connection being secured by a certificate associated with a transport layer security (TLS);

receiving, from the SM-DP+ via the HTTPS connection, an HTTPS response message including a profile in a tag-length-value (TLV) form, the profile in the TLV form being protected by a key set of symmetric keys; and transferring, to the eUICC, the profile in the TLV form, wherein the key set of symmetric keys is generated based on a key set generation procedure, wherein the key set generation procedure is performed based on a mutual authentication procedure, and wherein the mutual authentication procedure is performed between the SM-DP+ and the eUICC, based on a certificate associated with an eUICC controlling authority security domain (ECASD).

2. A method performed by a subscription manager data preparation+ (SM-DP+) in a communication system, the method comprising:

establishing a hypertext transfer protocol over a secure socket layer (HTTPS) connection with a terminal, the HTTPS connection being secured by a certificate associated with a transport layer security (TLS);

performing a mutual authentication procedure with an embedded universal integrated circuit card (eUICC) included in the terminal, based on a certificate associated with an eUICC controlling authority security domain (ECASD);

performing a key set generation procedure with the eUICC included in the terminal, based on the mutual authentication procedure;

generating a key set of symmetric keys based on the key set generation procedure; and transmitting, to the terminal via the HTTPS connection, an HTTPS response message including a profile in a tag-length-value form, the profile in the TLV form being protected by the key set of symmetric keys and being transferred to the eUICC included in the terminal.

3. A terminal including an embedded universal integrated circuit card (eUICC) in a communication system, the terminal comprising:

a transceiver; and a processor configured to:

identify an event associated with a profile download, from a subscription manager data preparation+ (SM-DP+) to the terminal, establish a hypertext transfer protocol over a secure socket layer (HTTPS) connection with the SM-DP+, the HTTPS connection being secured by a certificate associated with a transport layer security (TLS), receive, by controlling the transceiver, from the SM-DP+ via the HTTPS connection, an HTTPS response message including a profile in a tag-length-value (TLV) form, the profile in the TLV form being protected by a key set of symmetric keys, and transfer, by controlling the transceiver, to the eUICC, the profile in the TLV form, wherein the key set of symmetric keys is generated based on a key set generation procedure, wherein the key set generation procedure is performed based on a mutual authentication procedure, and wherein the mutual authentication procedure is performed between the SM-DP+ and the eUICC, based on a certificate associated with an eUICC controlling authority security domain (ECASD).

4. A subscription manager data preparation+ (SM-DP+) in a communication system, wherein the SM-DP+ comprising:

a transceiver; and a processor configured to:

establish a hypertext transfer protocol over a secure socket layer (HTTPS) connection with a terminal, the HTTPS connection being secured by a certificate associated with a transport layer security (TLS), perform a mutual authentication procedure with an embedded universal integrated circuit card (eUICC) included in the terminal, based on a certificate associated with an eUICC controlling authority security domain (ECASD), perform a key set generation procedure with the eUICC included in the terminal, based on the mutual authentication procedure, generate a key set of symmetric keys based on the key set generation procedure, and transmit, by controlling the transceiver, to the terminal via the HTTPS connection, an HTTPS response message including a profile in a tag-length-value (TLV) form, the profile in the TLV form being protected by the key set of symmetric keys and being transferred to the eUICC included in the terminal.

5. The method of claim 1, wherein the profile in the TLV form is encrypted by SCP03t.

6. The method of claim 2, wherein the profile in the TLV form is encrypted by SCP03t.

7. The terminal of claim 3, wherein the profile in the TLV form is encrypted by SCP03t.

8. The SM-DP+ of claim 4, wherein the profile in the TLV form is encrypted by SCP03t.

* * * * *